Figure 1:
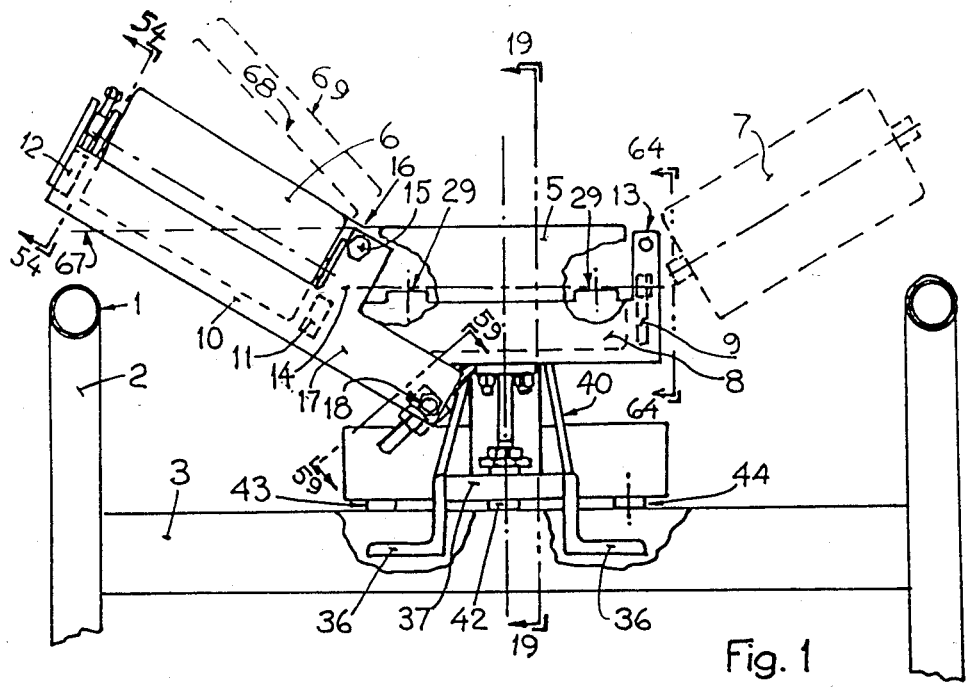

United States Patent [19]

Söderholm

[11] Patent Number: 4,557,341
[45] Date of Patent: Dec. 10, 1985

[54] BELT WEIGHING DEVICE WITH INDIVIDUALLY ADJUSTABLE REELS

[75] Inventor: Arne Söderholm, Bromma, Sweden

[73] Assignee: S.E.G. Resistor AB, Vallingby, Sweden

[21] Appl. No.: 610,415

[22] Filed: May 15, 1984

[30] Foreign Application Priority Data

Jul. 21, 1983 [SE] Sweden .................. 8304073

[51] Int. Cl.[4] ............... G01G 11/14; G01G 13/02; B65G 39/12
[52] U.S. Cl. ...................... 177/16; 177/119; 198/504; 198/826
[58] Field of Search ............ 177/16, 119–121, 177/187; 198/504, 505, 826

[56] References Cited

U.S. PATENT DOCUMENTS

| | | | |
|---|---|---|---|
| 2,427,590 | 9/1947 | Conners | 198/826 |
| 3,141,516 | 7/1964 | Moring, Jr. et al. | 177/16 X |
| 3,294,218 | 12/1966 | Chantland | 198/826 |
| 3,561,553 | 2/1971 | Blubaugh | 177/16 X |

Primary Examiner—George H. Miller, Jr.
Attorney, Agent, or Firm—Cushman, Darby & Cushman

[57] ABSTRACT

Weighing device for belt conveyors with individually adjustable reels for universal adaptation to different conveyors.

The device is characterized in that the weighing device reels are located in enclosing frames (8,9 and 10,11,12), that the frames of the lateral reels at the inner ends are attached (15) to the frame of the central reel, so that they are adjustable to different troughing angles of the conveyor belts. The angle of rotation is adjusted in that the frames of the lateral reels are extended (17) inward to the center of the weighing device, and at the ends an adjusting screw device (18) is located. The load measuring device consists of parallel springs for carrying and guiding the weighing reel stand, and the load measured is taken up by a load measuring transducer of electromechanical type.

7 Claims, 5 Drawing Figures

U.S. Patent     Dec. 10, 1985     4,557,341

BELT WEIGHING DEVICE WITH INDIVIDUALLY ADJUSTABLE REELS

For weighing the material passing over a belt conveyor, both the load on one or more of the conveyor reel stands and the speed of the belt are measured. The product of these measurement values is a measure of the material flow. The material amount having passed over the conveyor is obtained by integrating the flow.

For measuring the reel stand load, one or more of the conveyor stands are placed on a pair of scales. An accurate weight determination requires, that the geometry of the load measuring reel stands, i.e. the contact plane of the reels with the belt, is adapted accurately to the surrounding reel stands, and that the reel stands are mechanically rigid, so that the geometry will not be changed by the load. When these conditions are not met, the chucking force of the conveyor belt in the longitudinal direction affects the weight sensed of the material on the belt.

The tolerances required for the equality of the contact planes are of the magnitude 1/10 mm. This implies that the reels of the reel stands must have good concentricity and be levelled to the reels of the surrounding stands. The reel stands proper and the weighing device must be designed so as to be given a corresponding insignificant resilience for the load.

The load measuring reel stands can consist of stands from the conveyor placed on a weighing device. This device normally is of an electromechanical type and consists of an attachment device, which fixes the stand and transfers the load to a measuring force transducer, the electric output signals of which are a measure of the load. The aligning of the weighing unit close to said tolerences, with the embodiments according to above, is a tedious work, and the readjustments due to mechanical settlings in the conveyor also require much time. This applies especially to dished belts, where each reel stand comprises three reels, of which the two outer ones are angular so as to provide the belt with the troughing angles desired.

In order to simplify the aligning, preferably reel stands of a special design are manufactured for the pair of scales where the mechanical requirements can be satisfied. The stands are assembled also with the load measuring device to a weighing device unit, which easily can be aligned and secured in the conveyor bench. In order to simplify the fine adjustment, also reel stands for the weighing unit are used, of which the reels are arranged so that they are individually adjustable within the tolerance limits for the remaining reel stands of the conveyor, as disclosed in Swedish Patent Specification No. 414756. The mechanical structural designs of conveyors and reel stands, however, vary much and depend on the material conveyed, the capacity and the like. The mechanical properties of the conveyor belts also are different and, therefore, troughing angles and belts widths vary within wide limits. As a consequence, reel stands with a design suitable for weighing devices must be adapted individually to each type of conveyor and reel stand. The present invention consists of a weighing machine reel stand with weighing device primarily for dished belts, which stand is adjustable both to troughing angles and belt widths within wide limits and, besides, designed so that it can be built-in in existing types of conveyor frames. It is thereby possible to cover all types of conveyors with a few standard sizes. The manufacture of weighing devices can thereby be carried out in series of an extent, which otherwise is not possible.

The transport reels of the weighing device are placed each in an enclosing frame, so that at least the lateral reels are individually adjustable to different belt cuppings. The invention is characterized in that the frame of the central reel is attached to the load measuring device, which is designed so as to measure the reel stand load, that the frames of the lateral reels are provided with attachment means to the frame of the central reel, so that the lateral reels are rotary about axles in parallel with the longitudinal direction of the conveyor belt, with the centres of rotation located near to or in the intersection points of the upper reel shell generatices to the upper shell generatrix of the central reel, that the frames of the lateral reels are extended with arms, which are directed substantially in the longitudinal direction of these frames inward to the centre of the reel stand, and that in these arm ends distance members adjustable in their length are placed which rest against the lower surface of the central reel frame. The load measuring device can consist of two parallel strips, which guide the reel stand in the horizontal directions perpendicularly to the longitudinal direction of the belt, and the load of the reel stand is taken up and measured by an electric load measuring transducer, which is protected against overload.

The invention is described in FIGS. 1-5.

Figure 2:
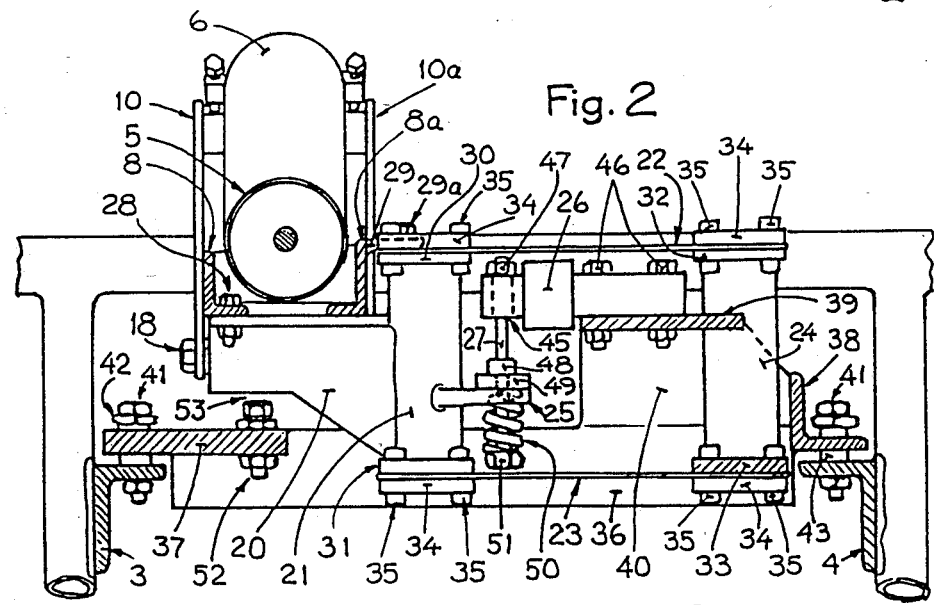
Figures 3, 4, 5:
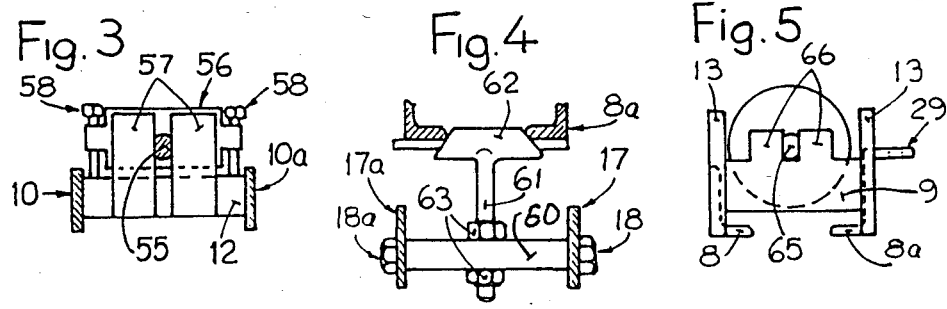

FIG. 1 shows an embodiment of the weighing device with attachments in a conveyor frame seen in the longitudinal direction of the conveyor belt. FIG. 2 is a section through the weighing device in the longitudinal direction of the belt, and FIGS. 3-5 show details of the weighing device according to FIG. 1.

FIGS. 1 and 2 show a conveyor frame comprising longitudinally extending tubes, 1, and transversely extending bars, 2, between which beams 3 and 4 are located, on which the weighing device is placed. The beams 3 and 4 are located in vertical direction so that the reels, 5-7, of the weighing device can be adjusted approximately to the levels of the remaining reel stands in this direction. The central reel, 5, is located in an enclosing frame, of which one long side, 8, is shown, and one short side, 9, is dashed. The lateral reels also are located in enclosing frames. The reel 6 is shown in its frame with the long side 10 and the two short sides 11 and 12. The second lateral reel, 7, is shown only dashed, and its frame, which is mirror-inverted relative to the aforementioned one, is omitted in the Figure. The frame of the central reel is provided in each corner with an attachment, 13, in the form of an upright to form hinged attachments of the lateral reels 6 and 7. The lateral reels have a corresponding mounting lug, 14, at the long sides 10 of the frames near to the short side 11 of the frame. The attachments are hinged by screws 15, one of which is shown in the Figure. The rotation centres of the hinges are located as close to the intersection points of the upper reel shell generatices as is structurally possible, when the vertical positions of the lateral reels are at minimum, i.e. when the reel adjustment devices 56-58 described with reference to FIG. 3 are in their lowermost position. In order to adjust the rotation angles of the lateral reels about the screws 15, the long sides 10 of the frames of the lateral reels are extended inward to the centre of the weighing device by arms 17, at the ends of which a combined reel angle adjusting and locking device 60-63 is located with the screw mountings 18, one of which is shown in the Figure. This arrangement is described below with reference to FIG. 4.

The supporting means of the central reel, 5, to the frame are described with reference to FIG. 5 below.

FIG. 2 is a section 19—19 through FIG. 1 and shows reel stand and weighing device from the conveyor side. The reel stand 5-18 is located on a bracket 20, which is fixed to the post 21. This post 21 constitutes a part of a parallelogram arrangement, which consists of two disk springs 22 and 23, the ends of which are attached, in addition to the post 21, to the post 24. The post 24 is fixed to the stand portion of the weighing device, which stand portion is attached to the beams 3 and 4. The post 21 thereby is fixed by the springs 22,23 in all directions except the vertical one in the Figure. Vertical loads on the post 21 are taken up via the bracket 25 and transferred by the draw bar 27 to the load measuring transducer 26. The reel stand 5-18 is attached to the bracket 20 by screws 28, one of which is shown. The inner one of the frame sides 8a of the central reel 5 is also attached by a pair of angle joints 29 and the screws 29a to the upper surface of the post 21. The location of the angle joints 29 along the frame side 8a appears from FIG. 1. The posts 21 and 24 are attached to the springs 22,23 by end plates 30-33. The planes of these plates are designed accurately in respect of the distance of the surfaces, i.e. the posts have equal length, and the planes are in parallel, so that the springs 22 and 23 are accurately in parallel. This is a prerequisite for vertical loads to unmistakably be transferred to the load measuring transducer 26. The springs 22,23 are fixed to the end plates 30-33 by means of the plates 34 and screws 35. The end plate 30 is extended transversely to the longitudinal direction of the spring 22, so that the ends of the plate constitute mounting members for the angle joints 29, thereby providing a rigid attachment of the reel stand to the post 21. The stand portion of the weighing device consists of two angular sections 36, which are connected at one end to the cross member 37 and at the other end to the angular beam 38. The lower end plate 33 of the post 24 (like the end plate 30) is extended, and its ends are fixed to the inner surfaces of the stand beams 36. The post 24 also is attached to the stand via the bracket 39, which is rigidly secured in the post 24 and connected to the beams 36 via the plates 40, one of which is shown in FIG. 1 and the second one in FIG. 2. The plates 40 extend in horizontal direction in the Figure from the outer edge of the bracket 39 past the post 24 all the way to the stand portion 38 where it is fastened.

The stand portion of the weighing device is attached to the beams 3 and 4 by the screws 41 and threaded barrel nuts 42-44, of which sleeve 43 is shown in FIG. 1. These three mounting points provide a stable attachment of the weighing device, and the barrel nut 42-44 constitute adjusting means for the central reel 5 in vertical direction.

The bracket 39 also constitutes an attachment for the bar-shaped load measuring transducer 26. It senses loads in known manner, for example by strain gauge, and emits an electric load signal only for loads in the direction transversely to the longitudinal axis of the bar in the vertical direction in the Figure. Its load-sensitive portion is located between the mounting hole 45 for the draw bar 27 and the right-hand mounting portion where the transducer 26 is fixed to the bracket 39 by the screws 46. The draw bar 27 transfers the load via the adjusting nut 47. By means of this nut the post 21 is vertically adjusted so that the springs 22 and 23 are set straight. The lower attachment for the draw bar 27 is an overload protection for the weighing device. The bracket 25 has the shape of a horizontal yoke with a central recess, so that the bar 27 can be inserted in from the right to the bracket 25 at the assembly. The bar 27 is provided with the shoulder ring 48, which rests against the plate 49, which abuts the bracket 25 and is fixed by screw connections, which are not shown in the Figure. Against the lower surface of the plate 49 a helical spring 50 abuts, through which also the draw bar 27 extends. The lower end of the draw bar 27 is threaded, and the spring 50 is compressed by the nut 51 with a force corresponding to the highest load for which the load measuring transducer 26 is dimensioned. When this load is exceeded, the spring 50 is compressed additionally, and the parts 48 and 49 are spaced apart, i.e. the column 21 with the reel stand 5-18 sinks down correspondingly to the compression of the spring until the lower edge of the bracket 20 abuts the stop screw 52. This screw is adjusted to have a suitable play 53 when the load of the weighing device is lower than the one permitted for the load measuring transducer 26. The spring 50 can be compressed to a suitable load before the overload details 48-51 and the bar 27 are mounted in the weighing device and thereafter is positioned by being threaded through the hole 45 of the load transducer to abut the bracket 25.

FIG. 3 is a section 54—54 in FIG. 1 and shows how the level adjustment of the lateral reel 6 is carried out. The reel, which can rotate on the axle, has bevelled axle ends 55, which are threaded through holes in the crosspiece 56. This crosspiece 56 is located between four plates 57, which are fixed to the short side 12 of the frame so as to form yokes with parallel sides, which guide the crosspiece 56. The plates 57 are located at a suitably adjusted distance between the yoke pairs, so that these also guide the bevels of the axle 55 and thereby prevent rotation of the axle. The crosspiece 56 is provided with adjusting screws 58, by which the axle 55 is adjusted in vertical direction. Due to the fact that the hole for the axle 55 is not located centrally in the crosspiece 56 in vertical direction, an extra adjustment of the axle level can be obtained when the crosspiece is turned so that the hole will be located above the centre line of the crosspiece.

FIG. 4 is a section 59—59 in FIG. 1 and shows the design of the device for adjusting the reel angle. The device consists of the bar 60, which is secured on the arms 17 and 17a. In the centre of the bar 60 an adjusting screw 61 is threaded through a hole in the bar. The adjusting screw 61 extends to the corner between the long sides 8,8a of the frame and the upper surface of the bracket 20. At the end of the adjusting screw 61 a crosspiece 62 is located, which has bevelled shortsides, so that it can be guided into and rest against said corner. The angle of the reel stand is adjusted by changing the operative portion of the adjusting screw and fixing it by the nuts 63 to the bar 60. The bar 60 being slightly shorter than the distance between the frame sides 17,17a, these sides are pressed to the central frame 8,8a when the screws 18 are tightened. FIG. 5 is a section 64—64 in FIG. 1 and shows the location of the central reel 5 in the frame 8,9. The reel 5 is mounted on the axle 65, which has bevelled ends. The axle rests against the shortside 9 and is guided so as not to be rotated by the yoke, which is formed between the two members 66 fixed to the side 9. The central reel is not provided with vertical adjustment devices, because the central reel can be levelled by the barrel nuts 42-44.

In FIG. 1 at reel 6 dashed lines 67-69 are shown which indicate adjustable positions for the upper shell generatrix of the reel. Line 67 shows the angle setting 0°, line 68 shows the position at a larger troughing angle with maintained position of the crosspiece 56, while line 69 shows the position with the crosspiece 56 placed in its uppermost position. As the lateral reels of the reel stand can be angularly adjusted from 0° to the highest angle used for conveyors and, besides, can be moved in vertical direction, the reel stand can be adapted within an interval of different conveyor belt widths. Most of the existing reel stand geometries can thereby be covered by some few well-selected standardized sizes. The weighing device and reel stand as to their extension in lateral direction are concentrated to the centre of the conveyor. No intrusion in the conveyor frame 1,2, therefore, must be made at their mounting. Such intrusions render the mounting substantially more expensive and can easily result in weakenings of the conveyor frame. As a load transducer 26 of standardized type can be used, which have the same mounting dimensions for different nominal loads, and as the overload protection 48-51 can be adjusted prior to the mounting in the weighing device, the possibilities of series fabrication of the weighing device are at optimum, and the cost-raising individual adjustment to different conveyors is eliminated.

The invention covers also other structural embodiments of the belt weighing device. For long conveyors with high belt tensions, for example, a weighing distance is required which is longer than obtainable with a single weighing device reel stand. In such cases a second reel stand according to the Figures can be placed on a foundation extending from the bracket 20 and extending to the right in FIG. 2 such a distance that said second reel stand is located to the right of the column 24. The increase in the weighing distance obtained hereby additionally reduces adjustment errors of the reels.

What I claim is:

1. A weighing device for belt conveyors with three driving reels located each in an enclosing frame, of which reels at least the lateral ones are individually adjustable, characterized in that the frame of the central reel is attached to a load measuring device of such a design as to measure the reel stand load, that the frames of the lateral reels are provided with attachment means to the frame of the central reel, so that the lateral reels are rotary about axles in parallel with the longitudinal direction of the conveyor belt where the centres of rotation are located near to or in the intersection points of the upper reel shell generatices to the upper shell generatrix of the central reel, that the frames of the lateral reels are extended with arms directed substantially in the longitudinal direction of said frames inward to the centre of the reel stand, and that at these arm ends distance members adjustable as to their length are located which rest against the lower surface of the central reel frame.

2. A weighing device as defined in claim 1, characterized in that at least the axle journals of the lateral reels rest in recesses in crosspieces, which are adjustably attached perpendicularly to the axles in vertical direction, or that the journals rest against vertical adjusting screws.

3. A weighing device as defined in claim 1, characterized in that the arms of the lateral reel frames are connected to the outer sides of the central reel frame.

4. A weighing device as defined in claim 1, characterized in that the load measuring device consists of parallel strips designed so as to guide the reel stand in horizontal direction, and that the load on the weighing device is transferred to and measured by an electric load measuring transducer.

5. A weighing device as defined in claim 1, characterized in that the load to the load measuring transducer (26) is transferred by a draw bar, which at its other end is provided with a pre-stressed spring, the pre-stress of which is adjusted to the maximum load to be measured.

6. A weighing device as defined in claim 1, characterized in that the load measuring device is attached to a conveyor frame by adjusting screws.

7. A weighing device as defined in claim 1, characterized in that it comprises an additional reel stand, which is attached to a reel stand bracket, which is designed so that the second reel stand is located on the other side of the load measuring device in the longitudinal direction of the conveyor belt.

* * * * *